Feb. 5, 1957

R. A. BAUDRY ET AL 2,780,739

CONDUCTOR-VENTILATED TURBINE-GENERATORS

Filed Sept. 28, 1951

WITNESSES:
Robert A. Baird
Nw. L. Groove

INVENTORS
Rene' A. Baudry and
Paul R. Heller.
BY O. B. Buchanan
ATTORNEY

Feb. 5, 1957
R. A. BAUDRY ET AL
2,780,739
CONDUCTOR-VENTILATED TURBINE-GENERATORS
Filed Sept. 28, 1951
3 Sheets-Sheet 2

WITNESSES:

INVENTORS
Rene' A. Baudry and
Paul R. Heller.
BY
ATTORNEY

Feb. 5, 1957 R. A. BAUDRY ET AL 2,780,739
CONDUCTOR-VENTILATED TURBINE-GENERATORS
Filed Sept. 28, 1951 3 Sheets-Sheet 3

WITNESSES:
Robert G. Baird
Mw. L. Groome

INVENTORS
Rene A. Baudry and
Paul R. Heller.
BY O. B. Buchanan
ATTORNEY

United States Patent Office 2,780,739
Patented Feb. 5, 1957

2,780,739

CONDUCTOR-VENTILATED TURBINE-GENERATORS

René A. Baudry, Pittsburgh, and Paul R. Heller, Irwin, Pa., assignors to Westinghouse Electric Corporation, East Pittsburgh, Pa., a corporation of Pennsylvania Application September 28, 1951, Serial No. 248,852

16 Claims. (Cl. 310—55)

Our invention relates to the ventilation of dynamo-electric machines, and while it is of more general application it has particular relation to ventilated-conductor or inner-cooled alternating-current generators which are driven by steam turbines. While some of the features of our present invention are susceptible of other applications and have broader descriptions, our invention is more particularly related to the ventilation of large high-voltage turbine-generators, preferably using, as the cooling-fluid, hydrogen at a pressure of at least 40 pounds per square inch gauge (p. s. i. g.), or lower pressures at higher velocities than have heretofore been normal, as will be decribed in detail hereinafter. While some features of our invention are applicable to the field or rotor-winding of a turbine-generator, our invention was particularly designed for, and has its preferred application in, a high-voltage stator or armature winding in which the transposed strands of each stator conductor are grouped around a duct or a stack of thin-walled ventilating ducts, which extend throughout the length of each coil-half, or at least throughout the length of each coil-side which lies within a stator-slot.

Our present invention, in some respects, is a modification of, and an improvement over, the ventilating means which are described and claimed in a companion Baudry application, Serial No. 109,999, filed August 12, 1949 (now abandoned), and its continuation-in-part, Serial No. 248,853, filed September 28, 1951. This copending Baudry application obtained improved ventilation by the use of high-pressure hydrogen, circulating in substantially direct contact with the strands of the stator-conductor, with no susbtantial heat-barrier intervening between the hydrogen and the conductor; and at the same time the high hydrogen-pressure was used as a means for obtaining a high breakdown-voltage for discharges in restricted spaces, thus making it possible to use open-creepage insulation in the stator-slots, that is, insulation made up of channel-members and flat insulation-barriers assembled in overlapping relation, so as to provide adequate creepage-distances between the overlapping points, so as to prevent arcing from the conductor to the stator-core or between conductors.

Our present invention inovlves a number of modifications and improvements, including the use of the previously mentioned core of thin-walled ducts, preferably but not necessarily, made of a high-resistance metal. Our invention also preferably, but not necessarily, includes the use of a major-insulation sheathing with dielectric-barrier properties, as distinguished from the channel-barrier or laid-on type of insulation for the stator-coils as described in the companion Baudry application. This major-insulation sheathing is preferably, although not necessarily, a pressed impregnated insulation, which is consolidated under heat and pressure, particularly along the coil-sides which lie within the stator-slots. The pressed impregnated type of major slot-insulation is often desirable, because of its excellent insulating qualities, even though it might have a thickness as much as 0.2 inch, instead of 0.1 inch, as compared with laid-on insulation, for 13,800 volts.

Our present invention also involves various novel features in regard to the places where gas is admitted to the duct-ventilated coils, or discharged therefrom, and whereby adequate creepage-surface insulation is provided.

While certain features of our invention are certainly applicable to machines having less than the highest ratings as to speed, voltage, and kilowatts, wherein the use of our present invention is advantageous but not obligatory, our invention appears to be a "must" in connection with turbine-generators having ratings higher than the present limit, which is rather conservatively set at 150,000 kilowatts. Large steam-turbine generators should preferably be two-pole machines, which, at 60 cycles, results in an operating speed of 3600 R. P. M.; because the operating economies of steam turbines at high temperatures and pressures are very much higher at 3600 R. P. M. than at 1800 R. P. M. Using the highest-quality steel forgings at present procurable for the rotor and for the retaining rings of the rotor, our turbine generators are at present limited, by the strength of the rotor-material, to a rotor diameter of something like 43 inches. The rotor-length, expressed as a multiple of the rotor-diameter, is also definitely limited by reason of the excessive deflections of the rotor when the length is higher than present standards. For these and other reasons, and until better materials and techniques are available, it is not possible to increase the physical size of generators. When more capacity is required, the only way available is to get more capacity out of the largest machine which can now be built.

In order to reduce the cost of electric power, it is necessary for the electric utility companies to use the largest generating units that can be effectively used by the individual systems and the interconnected systems of which they are functioning parts. The largest generator on a system should have a kilowatt-capacity not more than 10% of the total capacity of the system. Thus, the field of application for extra-large generator-ratings, in the 200,000 kilowatt class, or higher, is in central-station systems of 2,000,000 kilowatts or more. There are now, or soon will be, several systems in the United States, having 2,000,000 kilowatts or more, and in the next five years there will be six more such systems. The kilowatt capacity of any system doubles, on the average, every ten or twelve years.

Heretofore, the requirements for extra-large generator-capacities have been met by supplying two generators, which are driven by two stream turbines, connected cross-compound, one turbine being high-pressure, and the other low. This has required much valuable central-station space, more materials, and double foundations for the turbines and the generators, as compared to the use of a single, tandem-compound turbine, with one shaft, driving a single generator having the required rating. Although our present invention is not limited to such giants, it will readily be seen that an important application of our invention is in connection therewith.

With the foregoing and other objects in view, our invention consists in the systems, combinations, apparatus, parts, and methods of design and operation, hereinafter described and claimed, and illustrated in the accompanying drawing, wherein:

Figure 1 is a diagrammatic outline-illustration of a turbine-generator assembly, in which a single large generator is driven by a tandem-compound steam turbine, Fig. 2 is a simplified and somewhat idealized vertical longitudinal section, not to scale, showing one half of a generator, in which our present invention is used, in one of its forms, the section-plane being in the position indicated at II—II in Figs. 4, 5 and 6.

Figure 2:
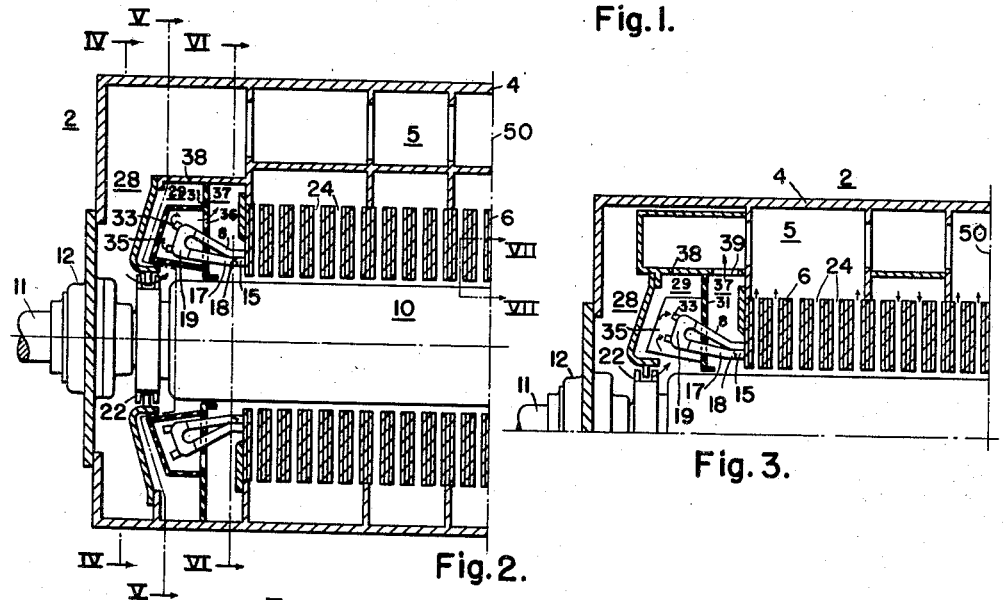
Figure 3:
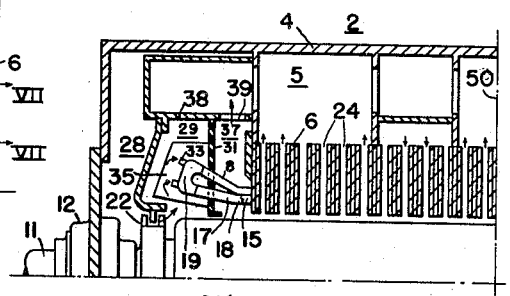
Fig. 3 is another longitudinal section, taken on an inclined plane, in a position such as is illustrated at the section-line III—III in Figs. 4, 5 and 6, showing the same machine, down to the center-line of the rotor.
Figure 7:
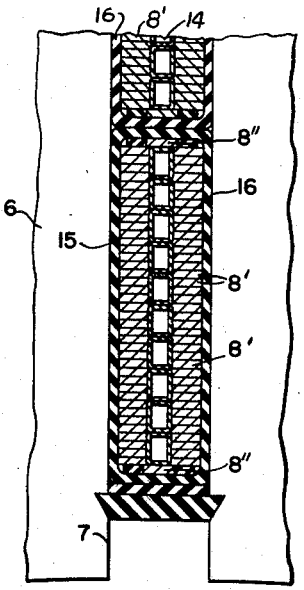
Figure 8:
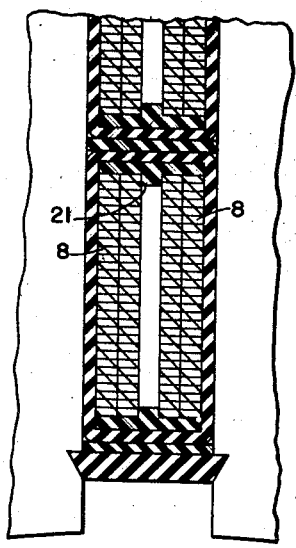
Figure 9:
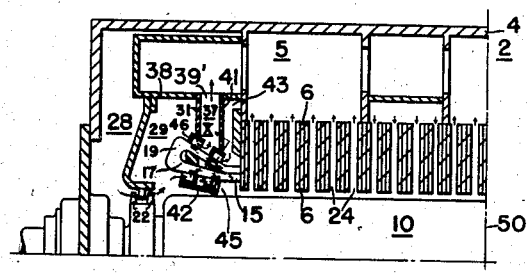

Fig. 7 is a fragmentary cross-sectional view through one of the stator slots, on a section-plane such as is indicated at VII—VII in Fig. 2, Fig. 8 is a view similar to Fig. 7, showing an alternative center-duct construction of the stator coil-side, Fig. 9 is a view similar to Fig. 3, but showing a construction in which separate streams of cooling-gas are used for the end-turn ducts and for the slot-lying ducts, so that the cooling gas does not have to flow through such a great length of ducts as in Fig. 3.

Figure 4:
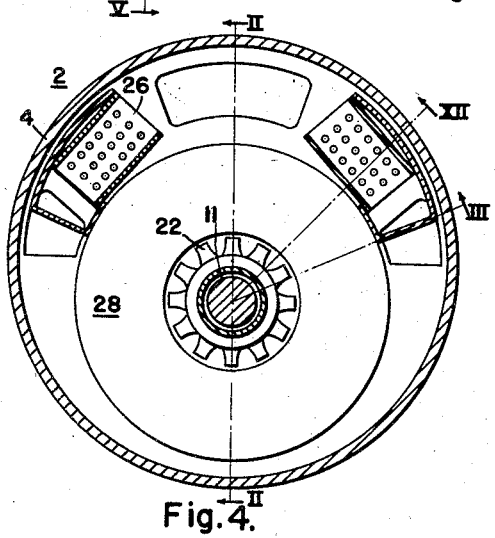
Fig. 4 is a transverse cross-sectional view of the machine shown in Figs. 2 and 3, the section being taken on the intake side of the fan, on a section-plane in a position such as is illustrated at IV—IV in Fig. 2.
Figure 5:
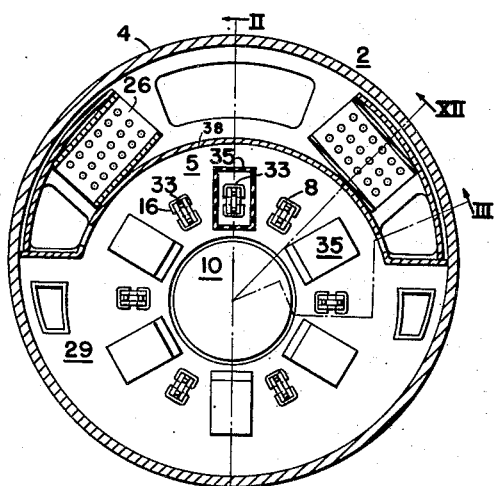
Figs. 5 and 6 are other transverse cross-sectional views, on section-planes such as are indicated at V—V and VI—VI in Fig. 2.
Figure 6:
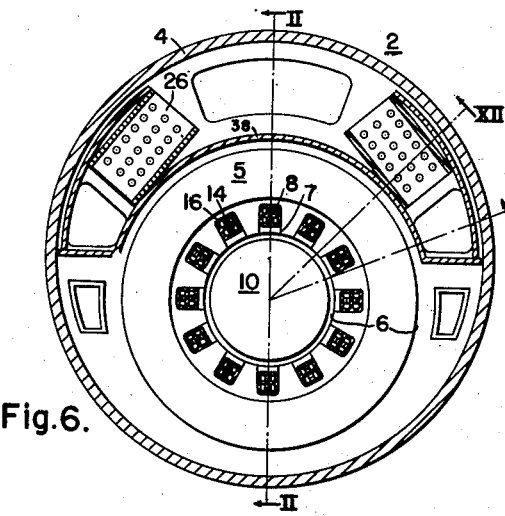
Figure 10:
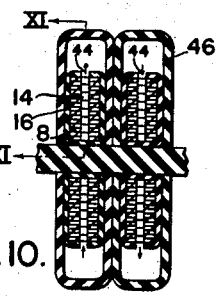
Figure 11:
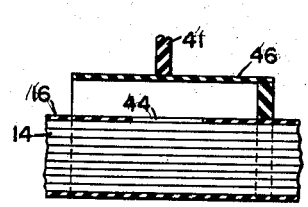
Figure 12:
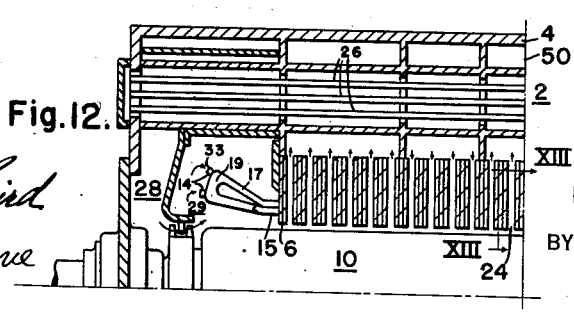
Figure 13:
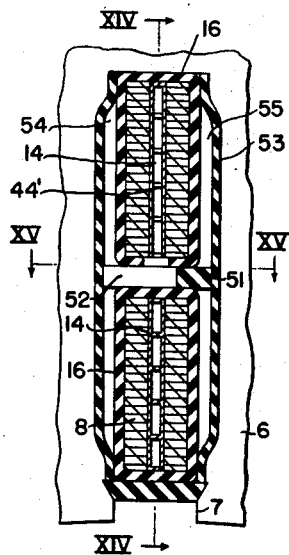
Figure 14:
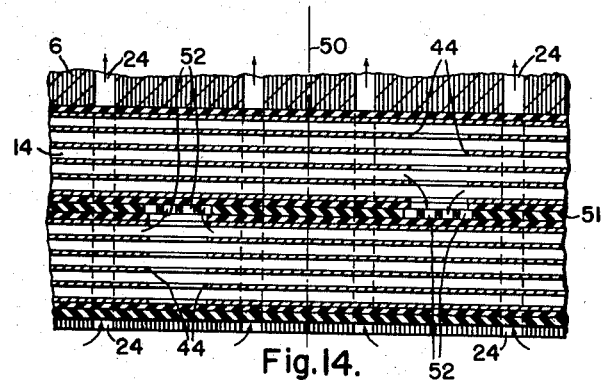
Figure 15:
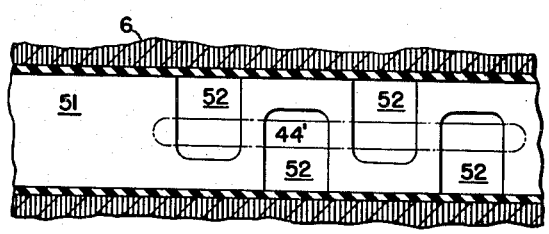
Figure 16:
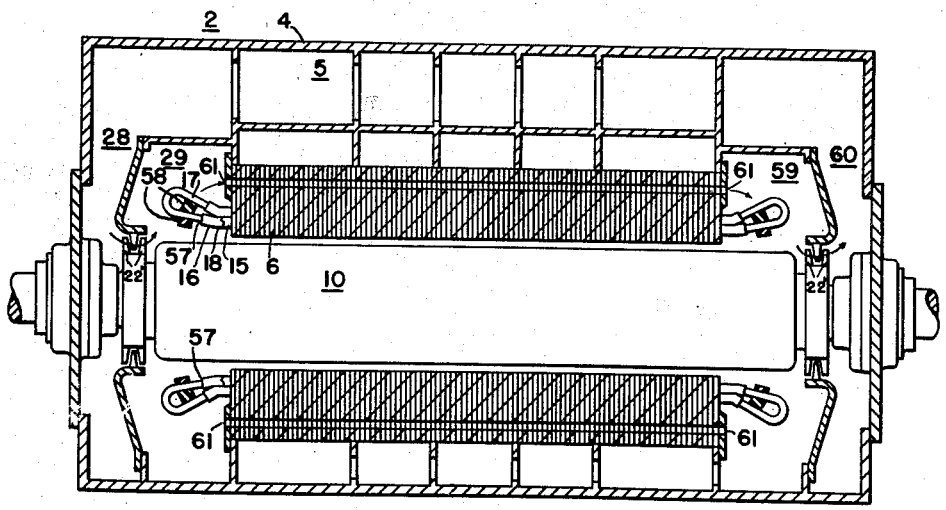

Fig. 10 is a fragmentary cross-sectional view showing the channel-shaped interphase creepage-members on a somewhat larger scale, the section-plane being indicated in Fig. 9 at X, Fig. 11 is a further detail of the channel-shaped interphase creepage member, the section being taken on the line XI—XI in Fig. 10, Fig. 12 is a longitudinal sectional view on a different inclined plane, in a position such as is indicated at XII—XII in Figs. 4, 5 and 6, the ventilating method for the stator-coils being changed, however, to apply to a center-vented core, so that the cooling gas comes in from each end of each stator coil-half and is vented at or near the center of the machine, Fig. 13 is a fragmentary transverse sectional view, on a larger scale, through one of the stator slots of Fig. 12, near the center of the machine, on a section-plane such as is indicated at XIII—XIII in Fig. 12, Fig. 14 is a fragmentary longitudinal sectional view on the line XIV—XIV of Fig. 13, Fig. 15 is a fragmentary cylindrical view, looking down on a spacer between the two coil-halves, as seen on a section-plane indicated at XV—XV in Fig. 13, and Fig. 16 is a longitudinal sectional view of a complete machine, on the section-plane II—II of Figs. 4, 5 and 6, the stator-coil ventilation being changed by leaving the end-turns bare, as distinguished from continuing the major insulation throughout the end-turns, as in the previous figures, and showing a stator-winding cooling-system in which the cooling-gas enters the ducts of the stator- conductors at the end-turns at one end of the machine, and leaves at the other end.

Figure 1:
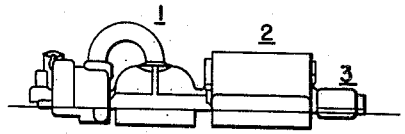

Fig. 1 shows, in rough outline, an important field of application of our invention in a tandem-compound steam-turbine generator-unit, comprising a turbine 1, a generator 2, and an exciter-housing 3. The generator 2 may be a 2 or 4-pole 3-phase machine, of almost any rating, but for fixing our ideas during the description, it may be considered to be a 2-pole 60-cycle 3-phase generator having a rating in excess of 175,000 kilowatts. This generator 2 may take any of the forms shown in the other figures of the drawing, or any modifications or adaptations thereof, embodying the same or similar features.

Figs. 2 to 7 are simplified illustrations of an illustrative form of embodiment of our generator, enclosed in a gas-tight housing 4, which is filled with a cooling-fluid, preferably a gas, and preferably hydrogen. The hydrogen may be at the standard pressure of ½ p. s. i. g., but preferably it will be at a considerably higher pressure, usually at least 40 p. s. i. g.; and probably the most desirable pressure, at least in many instances, will be of the order of 75 p. s. i. g. or more, on the basis of standard or usual fan pressure-heads for maintaining the recirculation of the hydrogen. A hydrogen-pressure of at least 40 pounds per square inch over the surrounding atmosphere, or 40 p. s. i. g., is particularly advantageous, when ordinary gas-velocities are used, in a ventilating-system in which the cooling-gas comes into substantially direct contact with, or good thermal relation to, substantially the entire length of the stator-conductors, as well as the rotor-conductors, with substantially no insulation between the gas and the conductor, as will be hereinafter described.

The generator-housing 4 encloses a stator member 5, comprising an annular stator-core 6 having a plurality of circumferentially spaced axially extending conductor-receiving slots 7, which carry the armature-winding or alternating-current winding 8 of the generator.

Rotatively disposed within the stator member 5 is a rotor member 10, the details of which are not shown, but which may be similar, in physical construction, to that which is shown in the Baudry Patent 2,221,567, granted November 12, 1940. The rotor member 10 has shaft-extensions 11 which are journaled in a bearing 12 which is carried by the housing 4. A suitable gas-tight liquid-seal is built into the bearing 12 for preventing hydrogen-leakage.

Our present invention is concerned primarily with the ventilated construction of one or both of the windings of the generator. This winding may either be the armature-winding 8, which is the stator winding of the machine, or it may be the rotor-winding, which we have not shown in detail. Our invention was particularly designed for a stator- winding, and especially a stator-winding having a voltage-rating of at least 5,000 volts, and usually more than 10,000 volts, because the major insulation for such a voltage constitutes a rather formidable heat-barrier which makes it difficult to extract heat from the stator-winding through this major-insulation barrier. Usually, when an inner-cooled or conductor-ventilated construction is used for the stator winding of a turbine-generator in accordance with our invention, some sort of inner-cooled or conductor-ventilated construction will be needed also for the rotor-winding, so that both the stator and the rotor may have somewhere near the same limiting rating; but in machines of extremely high voltage, our inner-cooling or conductor-ventilated principles might conceivably be applied only to the stator winding.

The stator-winding 8 of the machine which is shown in Figs. 2 to 7 is a two-layer winding, so that each stator-slot contains two coil-side portions 15, disposed in a radially superposed position, as shown in Figs. 2, 3, 5, 6 and 7. The winding is made up of preformed coil-halves, each composed of a stranded conductor which is made up of a plurality of relatively lightly insulated, transposed, conductor-strands 8' dividing the current between them, the transposition being indicated by the displaced top and bottom strands 8" in Figure 7, and being for the purpose of avoiding the heavy eddy-current loss which would otherwise be encountered in a deep unstranded strap-conductor, and also for the purpose of providing the flexibility necessary for bending the conductor in forming the winding.

In accordance with our invention, it is essential that the stranded stator-conductors shall be provided with suitable spacer-means, such as a stack of tubular duct-members 14, as shown in Fig. 7, for providing gas-conducting ducts lying alongside of the lightly insulated strands 8', so that the cooling-gas comes into good heat-exchanging thermal relation to the material of the conductor-strands 8', without any substantial heat-barrier therebetween. While any suitable duct-forming spacer-means might be used, within the broadest scope of our invention, an important form of embodiment of our invention involves the use of a stack of discrete thin-walled, open-ended, rectangular cross-sectioned, tubular duct-members 14, which are preferably lightly insulated from each other, so as to reduce eddy currents. In order to avoid unnecessary flux-leakage, and to reduce losses and vibration, these tubular duct-members 14 are preferably made of a non-magnetic material.

In order that the thin walls of the tubular duct-members 14 may conduct heat readily, so that they will not form any appreciable heat-barrier between the cooling-gas and the stator-conductor, these duct-members are preferably made of metal; but the metal is preferably a high-resistance metal such as brass or nickel-chromium-iron alloy called Inconel. At any rate, in order to avoid excessive eddy-current loss in the duct-members 14, they should have an electrical conductivity considerably less than copper, when measured in an encircling direction around a cross-section of any tubular duct-member. A metallic duct member material is also desirable in order to provide the requisite mechanical strength, as will be subsequently pointed out. As shown in Fig. 7, each duct 14 has a radial depth corresponding to that of a plurality of the strands 8', and each stack of ducts comprises more than two radially stacked ducts in each stack.

In a preferred form of construction of our stator-conductors, from which the armature-winding 8 is made, each conductor consists of two stacks of strands 8', which are displaced circumferentially by the stack of duct-means 14, so that the strands 8' are disposed on both sides of the ducts, with the ducts in the middle of the stranded conductor. This description is particularly applicable to the straight coil-side portions 15 which lie within the conductor-receiving slots 7 of the stator-core 6, but the duct-ends 33 preferably extend on through, to the diamond-bends or coil-apex portions 19, as subsequently described and as shown in Figs. 2, 3 and 5. The two halves of each stator-coil are shown as having their coil-side portions lying in circumferentially spaced slots and having their coil-apex portions adjacent to each other at an intermediate point between said circumferentially spaced coil-side portions at each end of the coil, being conventional turbo-generator armature-construction in this respect.

Each stator-conductor, besides having the conductor-strands 8', and the duct-members 14, is also provided with a solid, continuous major-insulation sheathing 16 of a type having dielectric-barrier properties, said sheathing surrounding said strands and spacer-means (or ducts), and the walls of said sheathing having substantially no gaps therein. In an important form of embodiment of our invention, this stator-winding sheathing 16 is made of a material (such as impregnated tape) which is capable of being consolidated under heat and pressure, and this consolidation is applied to the straight coil-side portions 15 which lie within the stator-slots 7. The tubular duct-members 14 should have a physical strength necessary to withstand such a consolidation-pressure. The walls of the ducts 14 are impervious to the impregnant which is used in the process of forming the major-insulation sheathing 16, thus constituting a practical means for manufacturing an inner-ventilated coil-side having impregnated insulation. A well-known method of manufacturing the stator-coils 8 and their sheathing 16 (apart from the ducts 14 which we have added) is described in Graham Lee Moses' book on "Electrical Insulation," published in 1951 by McGraw-Hill, at pages 89–90.

In addition to the straight coil-side slot-lying portions 15, the stator winding 8 also has end-winding portions 17 which join the straight coil-side portions at the respective ends of the machine. These end-winding portions 17 may be separate pieces which are welded or brazed to the ends of the straight coil-side portions 15, or they may be integral therewith. In the machine which is illustrated in Figs. 2 to 7, the end-winding portions 17 are formed integrally from the same ventilated conductor which is used for the straight coil-side portion 15, being formed by circumferentially bending the conductor at the point where the end-windings or turns 17 join onto the coil-side portion 15, the bends being shown at 18.

The major-insulation sheathing 16 extends also over the circumferentially extending end-turn portions 17, as shown in Figs. 1, 3 and 6, and as described on page 90 of Moses' book, above-cited.

In order that these bends 18 may be made, without collapsing the walls of the tubular duct members 14, in the process of pre-forming the stator-winding 8, preparatory to placing it in the machine, these tubular duct-members are first filled with a fluid filling-material (not shown), which is capable of preventing the collapsing of the tubular duct-members, during the bending-operation. Such a filling-material might be a molten filler material, such as wax or rosin, or a metal alloy, which melts at a temperature which is preferably not higher than the maximum temperature which can be withstood by the rest of the winding-material, including the major-insulation sheathing 16. This molten filler-material will solidify at a temperature convenient for performing the bending-operations. Thus, the bending operation, which is employed in forming the pre-formed or already-bent coil-shapes, consists in first introducing the molten filler-material (not shown) in the tubular duct-members 14, at a temperature at which said filler-material is melted, subsequently cooling the winding-material to a solidifying temperature, then bending the winding-material to form the required bends 18 between the straight coil-sides 15 and the end-turns 17, and also (if needed), the diamond-bends 19 at the apexes of the end-windings, and then melting and removing the filler-material from the duct-members 14.

While we have described our preferred duct-forming spacer-means, in the shape of a stack of duct-members 14, we wish it to be understood that any suitable or equivalent duct-forming spacer-means could be used, which would keep the two stacks of conductor-strands 8' separated from each other, to form a gas-conducting duct therebetween, or to otherwise provide a gas-duct in such a fashion that the gas comes into good thermal contact with the conductor.

An alternative construction of this kind as shown in Fig. 8, in which a double, stranded-conductor construction is used, in which the strands of each conductor are completely transposed and bakelized (or otherwise cemented together) separately, and the two self-supporting individual conductors can then be assembled for center-ventilation with suitable spacers 21, as shown in Fig. 8.

In inner-cooled or conductor-cooling systems, such as we have shown, wherein the cooling fluid comes into substantially direct contact with the conductor itself, so that the conductor-heat does not need to be removed through the thickness of the major insulation 16, it is desirable, not only to use hydrogen at pressures which are considerably higher than atmospheric, but also to drive the hydrogen through the conductor-cooling ducts 14 at high velocities. The hydrogen-circulating means is illustrated as being in the form of a fan 22 which is carried by the shaft 11 at each end of the rotor member 10, within the housing 1, and in order to produce the high hydrogen-velocities which are desirable in the ducts 14, we preferably use a multiple-stage fan 22, which (on a machine having a 37-inch rotor-diameter) would produce at least a fan-pressure of 36 inches of water, when used in air at atmospheric pressure, as contrasted with the usual fan-pressures of 12 to 25 inches.

It will be understood that these fan-pressures are used for ventilating both the stator and rotor members of the generator. The rotor-conductors have not been shown, because they may be substantially the same, in construction, as is shown in the Baudry Patent 2,221,567, which is a rotor-conductor construction having center ducts in the rotor-conductors, (not shown). In these ventilated rotor-conductors, the high-pressure hydrogen is circulated, at high velocities, principally by the action of the rotor, which acts as a centrifugal blower, with sometimes only a relatively small blowing-action being produced in the ducts of the rotor-conductors by our fans 22.

In our inner-cooled construction, since we extract the heat directly from the stator-conductors to the cooling-gas, we do not cause this conductor-heat to flow into the stator core, and hence we do not have to remove nearly as much heat, from the stator core, as in previous designs where most of the heat of the stator-conductors passed through the major insulation in the slots and thence into the stator core, so that this heat had to be removed from the stator core. As a consequence, we can considerably reduce the size of the ventilating passageways which are required for the stator-core ventilation, and this is a means for obtaining a reduction in the overall length of the machine.

Heretofore, the standard ventilating-system for the stators of turbine-generators has involved the use of bundles of stator laminations, which are separated by radial ventilating-spaces, as indicated at 24 in Figs. 2, 3, 9 and 12. In our present construction, the number and width of these radial vents 24 in the stator-core 6 can be very much reduced, or they could be replaced by other known systems of core-ventilation, if desired.

The hydrogen which is enclosed within the machine-housing 4 is cooled by suitable coolers, which are shown, by way of illustration, as being axially disposed coolers 26, through which the recirculated hydrogen is passed by any suitable baffling-means, examples of which are well known in the art.

In the illustrated forms of embodiment of our invention, as shown in Figs. 2 and 3, for example, the cool gas, after passing through the coolers 26, is drawn through the intake-space 28 of the fan 22, at each end of the machine, and the high-pressure gas, which is delivered by the fan at 29 is forced through the ventilating passageways 14 of the stator-winding 8. After passing through these ventilating passageways, the hot, low-pressure gas is caused to pass through the coolers 26, thus completing the recirculating cycle.

In order to describe and illustrate some definite form of of embodiment of our invention in Figs. 2–6, we have described this recirculation-process, and illustrated it by arrows in the drawing, as if the fan 22, at each end of the machine, were blowing inwardly, towards the stator-core 6 and the rotor member 10, which is the usual construction. We wish it to be understood, however, that this direction of gas-circulation could easily be reversed, so far as our present invention is concerned.

In the form of embodiment of our invention which is shown in Figs. 2 and 3, the recirculating gas-system is of a type in which the cooling-gas passes all the way through the ducts 14 of the coil-halves, from the diamond-bend 19 of the end-turns 17 at one end of the machine, to the diamond-bend 19 at the other end, which is not shown, as it is a duplicate of the end which is shown in Figs. 2 and 3. The gas flows from left to right through half of the coil-halves, and from right to left through the other coil-halves, thus providing a counterflow, in adjoining coil-sides 15, which is sometimes desirable in helping to equalize the temperature.

As a means for producing such a counterflow in adjacent coil-sides, we have shown, in Figs. 2 and 3, a recirculating means or system in which there are two hydrogen-zones, at different hydrogen-pressures, in each of the end-winding spaces at each end of the machine, these two different-pressure zones being separated by a radially disposed insulating baffle-ring 31, extending across the end-windings 17 at each end of the machine.

The gas which is delivered by the fan 22 at each end of the machine, assuming the illustrated direction of gas-flow, feeds into the high-pressure gas-zone 29, between the blower or fan 22 and the radial baffle-ring 31. Or, in general, considering that the direction of gas-circulation may be either way, this fan-induced pressure-differential zone may be referred to as broadly as that, namely, a pressure-differential zone, rather than a high-pressure zone. For convenience in description and illustration, it is almost necessary, however, to describe some particular direction of recirculation, and hence we will refer to the zone 29 as if it were a high-pressure zone, with the understanding that, if the direction of circulation were reversed, it would become a low-pressure zone.

At each of the diamond-bends 19, in the middles or extreme ends of the end-turns 17, the stator-conductor ventilating-ducts 14 are brought out or exposed, as indicated by the duct-ends 33 in Figs. 2, 3 and 5, so that the hydrogen or other cooling-gas may either enter or leave these ducts at these points. At each end of the machine, as shown in Fig. 5, the alternate circumferentially adjacent duct-ends 33 are segregated from each other, by being enclosed within insulating baffle-caps 35, which are secured to the high-pressure side of the radial baffle-ring 31, and this radial baffle-ring is provided with a series of openings 36, Fig. 2, which communicate with the spaces within the baffle-caps 35, so as to put these baffle-cap spaces in communication with the low-pressure gas-zone 37 which is located between the radial baffle-ring 31 and the stator-core 6.

The outer peripheries of the high and low-pressure zones 29 and 37 are bounded by an arcuate baffle 38, the low-pressure end of which is provided with an opening or openings 39, Fig. 3, in communication with the low-pressure gas-zone 37, so as to discharge the gas, from this low-pressure zone, into the baffling-system which causes the gas to flow circumferentially across the coolers 26, after which it flows back to the intake-space 28 of the fan 22 at each end of the machine.

It will be understood, of course, that it is necessary to provide suitable phase-to-phase creepage-spaces, in order to properly insulate the end-turn stator-conductors which are at different electrical potentials, and to this end, the radial baffle-ring 31 and the respective baffle-caps 35 are both made of insulating materials, properly butted to each other; and the insulating radial baffle-ring 31 is likewise properly sealed to the major insulating sheathing 16 surrounding the end-turns 17, so as to provide adequate creepage-distances.

With the baffling means which has just been described in connection with the illustrative form of embodiment which is shown in Figs. 2 to 6, the high-pressure gas 29 enters the open duct-ends 33 of alternate coil-halves of the stator-winding 8, and passes through the entire length of the respective coil-halves, leaving the same at the cap-enclosed duct-ends 33, at the other end of the machine, so that it is vented through the openings 36 into the low-pressure zone 37 at said other end, and thence through the openings 39 into the cooler-traversing duct-system.

The effectiveness of our stator-winding cooling, by means of gas-ducts or passageways 14 in substantially direct thermal contact with the stator-conductors, is considerably greater, the shorter are the duct paths within or alongside of the conductors. In view of this circumstance, it is frequently desirable to design the hydrogen-recirculating system so as to limit the lengths of these duct-paths within or alongside of the stator-conductors.

Thus, in Fig. 9, we show an alternative recirculation-system in which three separate gas-zones are provided, at each end of the machine. We retain the previously described radial baffle-ring 31, and we add another radial baffle-ring 41, which is disposed between the ring 31 and the adjacent end of the stator-core 6. The inner periphery of the intermediate low-pressure zone 37, which is disposed between the two radial baffle-rings 31 and 41, is closed off by an inner, approximately cylindrical baffle 42, so that the high-pressure gas 29 of the outer zone, communicates, under this cylindrical baffle 42, with an inner high-pressure zone 43 which is between the radial baffle-ring 41 and the end of the stator-core 6. The previously described low-pressure discharge-openings 39, in the arcuate baffle 38, are now disposed between the two radial baffle-rings 31 and 41, as indicated at 39' in Fig. 9.

Any suitable means are used, in Fig. 9, for providing separate gas-streams in the end-turn ducts 14 and in the slot-lying ducts 14, thus reducing the effective length of these ducts 14, through which the gas must pass. Thus, in the form of our invention which is shown in Fig. 9, at each of the places where a stator-conductor passes through each one of the radial baffle-rings 31 and 41, the stack of ducts 14, in each of the stator-conductors, is provided with suitable lateral duct-opening 44; or, in general, means are provided for introducing (or exhausting) gas into the ducts 14 of the straight coil-side portions 15, at a point 45 which is axially spaced from the end of the stator-core 6 by a distance of some three to five inches, or whatever other distance may be required for a suitable creepage-distance from the end of the stator core, this point 45 corresponding to the lateral duct-openings 44 which are in line with the inner radial insulating baffle-ring 41. By lateral duct-openings, we mean openings which are at right angles to the direction of gas-flow through the ducts 14.

A separate gas-stream is then provided between the above-described point 45, and some point near the extreme end or diamond-bend 19 of the end-windings 17, this last-mentioned point, in Fig. 9, being the lateral duct-openings 44 which are in line with the outer radial baffle-ring 31.

In Fig. 9, as in Fig. 2, a counter-flow ventilating system is used, in which gas flows in one axial direction, in the ducts 14 of every other circumferentially spaced stator-conductor, and in the other axial direction in the intervening conductors. To this end, the various stator-conductors, at each of the points where the lateral duct-openings 44 are disposed, are covered with suitable insulating baffle-caps 46, which are shown more in detail in Figs. 10 and 11, for venting successive circumferentially spaced stator-conductors, first to a high-pressure zone, 29 or 43 as the case may be, and then to the low-pressure zone 37, at the same time providing adequate interphase creepage-distances. It will be understood that, at the points where the lateral duct-openings 44 are provided, the side-walls of the insulating sheathing 16 are provided with similar openings 44, to admit the ingress or egress of the cooling-gas.

As an alternative means for reducing the length of the duct-paths for the cooling-gas which cools the stator-conductors, instead of causing the cooling-gas, as in Fig. 2, to enter at one extreme end 19 of a coil-half, at one end of the machine, and to leave the coil-half at its other extreme end, at the other end of the machine, we may cause the cooling-gas to enter the ducts 14 of each coil-half of the stator-winding 8, at each end of the machine, and we may vent or discharge the duct-gas at or near the axial center-line 50 of the machine. In this way, we not only cut the effective duct-lengths substantially in half, but we also somewhat simplify the provisions which are needed, at the end, to provide adequate ground and interphase creepage-distances, as compared with the constructions shown in Figs. 2 and 9.

Thus, in Fig. 12, there is a single gas-zone at each end of the stator-core 6, this gas-zone being a high-pressure zone 29. From this zone, the gas is caused to flow axially through the ducts 14 of at least the slot-lying straight coil-side portions 15 of the stator-winding 8. In the form of embodiment of the invention shown in Fig. 12, the high-pressure gas 29 flows into the duct-ends 33 at the extreme ends of the respective coil-halves, that is, at the diamond-bends 19 of the end-turn portions 17. At or near the axial center-line 50 of the machine, the ducts 14 of the straight coil-side portions 15 are laterally vented, so as to discharge the duct-gas into the correspondingly located radial vents 24 of the stator-core 6, as will now be described.

It is necessary to provide adequate interphase creepage-distances, as well as ground creepage-distances, in Fig. 12, at the centrally located places where the ducts 14 of the straight coil-side portions 15 are laterally vented into the corresponding radial vent-ducts 24 of the stator core. A suitable creepage-providing means, to this end, is shown in Figs. 13, 14 and 15. We have illustrated our invention as using the usual two-layer stator-winding construction, in which one coil-side 15 of each coil lies in the top (or air-gap) half of one slot 7, and the other coil-side 15 of the same coil lies in the bottom half of a circumferentially displaced slot 7. As shown in Fig. 13, in any stator-slot 7, the upper and lower coil-sides (at least in the slot-portion near the axial center-line 50 of the machine), are physically separated by a spacer 51, which should be made of insulating material. The upper coil-side, in any slot, is provided with lateral duct-openings 44', opening toward the insulating spacer 51 at a point which is axially displaced in one direction (say to the left), with respect to the axial center-line 50 of the machine; while the lower coil-side of that slot has its lateral duct-openings 44', opening toward the insulating spacer 51 at a point which is axially displaced in the other direction (say to the right), with respect to the axial center-line 50 of the machine.

At each of the points where these duct-openings 44' are provided, the insulating spacer 51 is provided with a plurality of notches 52, as shown more clearly in Fig. 15. At each of these same points, where the duct-openings 44' are provided, and where the slot-spacer 51 is notched, the stator-slot 7 is enlarged, as shown at 53, Fig. 13, so as to provide short gas-ducts or spaces 54 and 55 on the respective sides of the vented coil-side. The spacer-notches 52 open alternately, first to one side, to vent the duct-opening 44' to one of the spaces 54, and then on the other side, to vent the duct-opening 44' to the other space 55. These two spaces 54 and 55 extend axially long enough, respectively, so that each will communicate at least with its two of the radial vents 24 of the stator-core 6, on one side of the center-line 50 of the machine. In this way, there is a considerable axial creepage-distance, along the slot-spacer 51, between the duct-openings 44' of the upper and lower coil-sides, in any stator-slot 7, thus providing suitable ground and interphase insulation.

In all the forms of embodiment of our invention, the most difficult stator-winding portions to be cooled are the slot-lying straight coil-side portions 15. Also, in all of the illustrated forms of embodiment of our invention, it is necessary to provide breaks or openings, in the major insulating sheathing 16 of the stator-conductors in the end-winding portions 17, and hence it is necessary to provide adequate interphase and phase-to-ground creepage-insulation strength when using openings in the side-walls of the major-insulating sheathing 16 of the stator-conductors.

It will certainly be possible, at least in many cases, to still provide the necessary creepage-insulation distances if the major-insulation sheathing 16 is entirely removed from most of the end windings 17, as shown in Fig. 16. It will be understood that when the straight coil-side portions 15 come out of the stator-slots 7, at each end of the stator-core 6, they extend out straight, for an inch or two or three, and then they bend, at 18, to form the end-turn portions 17, so that the top coil-side fans away, in one circumferential direction, while the bottom coil-side fans away in the other circumferential direction. After these top and bottom coil-sides, which come out of any stator slot, have fanned away from each other for a sufficient distance, their major-insulation sheathing 16 can be stripped off, as indicated at 57, in Fig. 16, leaving the stator-conductors bare throughout the rest of the end-windings 17. Of course, when the bare end-winding conductors pass across each other, they will have to be suitably separated by insulating spacers 58, suitably held in place, so as to provide not only adequate physical separation, but also adequate insulating creepage-distances, but if the cooling-gas is maintained reasonably clean, and at a sufficiently high pressure, there will be no insulating difficulties at these spacers 58. In like manner, at the points 57 where the major-insulation sheathing 16 ends, it is possible to provide adequate creepage-distances, for interphase insulation, particularly if the cooling-gas is maintained sufficiently clean.

In Fig. 16, we have also indicated a further alternative, with respect to the gas-recirculation system, in which the ventilating-fan 22, at the left-hand end of the machine, is an in-blowing fan, blowing the cooling-gas towards the stator-core, making a high-pressure zone 29 at this end of the machine, while the other fan 22', at the other or right-hand end of the machine, is an out-blowing fan, drawing the cooling-gas away from the stator-core at that end of the machine, and creating a low-pressure zone 59 at that end of the stator-core. In this way, by dispensing with the counterflow gas-circulating method, we considerably reduce the creepage-distance baffling which is necessary when alternate coil-sides have gas flowing in opposite axial directions, and we accomplish this at the expense of only a slight temperature-difference between the right and left ends of the stator member 5.

It will be understood that the gas-circulating baffling, in Fig. 16, will be modified so that the right-hand fan 22' discharges gas into a high-pressure zone 69, at the extreme right-hand end of the machine, and this gas is then lead axially in the space around the periphery of the stator-core, from which it flows circumferentially through the previously described coolers 26, from which the gas returns to the fan-intake space 28 at the left-hand end of the machine. The precise details of this general type of baffling means, in Fig. 16, are not important.

In Fig. 16, we have shown the stator-core 6 as being ventilated by suitable axially extending vents 61, by way of example.

The heat-exchange from an electrical conductor to a stream of cooling-gas flowing alongside of the conductor, in good thermal relation to the conductor, involves two heat-components, namely the surface temperature-drop from the conductor to the gas, and the temperature-rise of the gas, the second-named component being much the larger, under the conditions prevailing in most applications of our invention. For a given duct-size, duct-shape, and gas, and assuming a turbulent gas-flow, or a Reynolds' number greater than 3000, which is true in applications of our invention, the heat-transfer coefficient across the boundry-surface between the conductor and the gas is essentially a direct function of $(V_D P)^{0.8}$, while the gas-temperature-rise is essentially a direct function of $(V_D P)$, where $V_D$ is the average duct-velocity of the stream of the cooling gas, and P is the average absolute pressure of the gas in the conductor-cooling ducts. (In pounds per square inch, P is equal to the gauge-pressure plus 15.)

Therefore, the cooling-characteristics may be altered by a change in either the duct-velocity $V_D$ or the absolute gas-pressure P, or both.

The duct-velocity $V_D$ of the gas is dependent upon the differential pressure, or pressure-head $H_D$ across the coil (or from end-to-end of the duct which lies alongside of the conductor), and it is also dependent upon the inlet and outlet conditions, the bends, the duct-dimensions, and the smoothness of the surface of the duct. Under the conditions prevailing in applications of our invention, this differential pressure $H_D$ is proportional substantially to the square of the duct-velocity, that is, to $V_D^2$.

In any machine, the total pressure-head H which is necessary to maintain recirculation of the cooling-gas includes other pressure-drops, mainly in the cooler, in addition to the differential pressure from end-to-end of the ducts, but these additional pressure-drops are usually relatively small, as compared to the duct-drop $H_D$, and these additional pressure-drops are also dependent upon some function of the rate of gas-flow. We may consider, therefore, as a sufficiently close approximation or design-criterion (for defining our invention as distinguished from the prior art), that the average duct-velocity $V_D$ is proportional to the square root of the total pressure-head, that is to $\sqrt{H}$.

In machines using shaft-mounted fans, the available fan-pressure is a function of the peripheral rotor-velocity $V_R$. Thus, the fan-pressure, expressed as the pressure-head of a column of whatever gas is being used, in feet, is $H = c V_R^2 / 2g$, where $V_R$ is the peripheral rotor-velocity in feet per second, $g$ is the acceleration of gravity, or 32.2 feet per second, and $c$ is a constant. (For the usual single-stage shaft-mounted fans, whether axial blowers or centrifugal blowers, the coefficient $c$ usually does not exceed 0.4, or at the most 0.5, and it is often much less.)

A fan pressure-head of 25 inches of water, when operating in standard air, is equivalent to a gas-head of $$H = \frac{25 \times 62.4 \text{ (the water-density)}}{12 \times .075 \text{ (the air-density)}}$$

$= 1,730$ feet (of whatever gas is used)

For inner-cooled stator-coils, with the gas-stream in good thermal relation to the stator-conductors, the available recirculation-maintaining pressure-head H is the pressure-head produced by the fan 22 or its equivalent. For inner-cooled rotor-coils, with the gas-stream in good thermal relation to the rotor-conductors, the available recirculation-maintaining pressure-head H is the sum of the effective fan-pressure, which gets to the rotor, plus the centrifugal-blower effect of the rotor itself, which is also a function of the square of the peripheral rotor-velocity, that is $V_R^2$.

As distinguished from prior-art practices, our invention may be broadly characterized as follows, so far as pressure-heads, velocities, and absolute gas-pressures are concerned.

For the stator-ducts alongside of the stator-conductors, our recirculation-maintaining pressure-head, in feet of the gas, is $H \leqq 16 V_R^2 / P^2$ (for the stator) where $V_R$ is the peripheral rotor-velocity, in feet per second, and P is the average absolute pressure of the gas in the ducts, in pounds per square inch;

and our product of the average duct-velocity $V_D$ (in the stator) and the average absolute gas-pressure P (in the stator ducts) is $V_D P \leqq 200,000$ (for the stator), where $V_D$ is the duct-velocity in feet per minute, and P is the absolute gas-pressure in pounds per square inch.

For the rotor-ducts alongside of the rotor-conductors, our effective recirculation-maintaining pressure-head, in feet of gas, in terms of the above-defined design-constants, is $H \leqq 24 V_R^2 / P^2$ (for the rotor)

and our product of the average duct-velocity $V_D$ (in the rotor) and the average absolute gas-pressure (in the rotor-ducts) is $V_D P \leqq 300,000$ (for the rotor)

The above figures apply more particularly to hydrogen-cooled machines, but since hydrogen is the most effective cooling-gas known, particularly among the lighter-than-air gases, the same design-limits can be used for other cooling-gases, with the understanding that the other gases would give a somewhat lower machine-rating. Hydrogen is a better cooling-agent than air, and has a much lower windage-loss. Helium is a slightly worse cooling-agent than air, at atmospheric pressure, better above atmospheric pressure, but it has substantially less windage-loss than air, making helium a possible substitute for hydrogen, under some circumstances.

The foregoing discussions, linking absolute gas-pressures with duct-velocities or fan-pressure-heads, are also predicated, of course, on the use of a type of major insulation which is operative at the gas-pressure which is used, as distinguished from an insulation which requires a predetermined high gas-pressure in order to achieve a sufficient breakdown-strength, as in the case of the laid-on or overlapping insulation which was shown in the previously mentioned Baudry application. Our solid, continuous sheathing 16, having dielectric-barrier properties, satisfies our requirements as to the major insulation for the stator winding. The same principles of design, or adequate creepage-distances, will suffice for the rotor-insulation.

In many or most cases, in using our invention, the very excessive fan-pressure-heads which would be required, to obtain the necessary conductor-cooling at low gas-pressures, will limit the minimum absolute gas-pressure P at which the machine could be given a reasonable rating. For example, it is not contemplated that this minimum practical gas-pressure would often, if ever, be less than 30 pounds per square inch absolute, or 15 pounds per square inch gauge, in any machine in which our invention would be applied, and in that case, the major insulation would of course have to be of a known (or unknown) type which is adequate at that minimum gas-pressure (and of course at any higher pressures for which the machine is designed). In general, it may be said that our major insulation has its adequate insulation-strength at least at some value of absolute gas-pressure between 30 and 55 pounds per square inch.

In turbine-generators to which our invention is principally (or most importantly) applicable (although our invention is not altogether limited thereto), the following constants also apply: the peripheral rotor-velocity is at least 420 feet per second, and the ratio of core-length to rotor-diameter is at least 3.0.

From the foregoing description, it will be perceived that very important advantages flow from our present invention. By taking the heat directly out of the stator-conductors, without passing it through the stator-core, we reduce the core-length by reducing the problem of cooling the stator core. We also push out, to higher limits, the largest possible kilowatt-ratings of turbine-generators, thus avoiding the necessity for using cross-compound turbines, with their extra weight, floor-space, foundation-space and building-space, and requisite crane-capacity.

By providing an adequate means for taking heat directly away from the stator-conductors, without having to pass through the major-insulation sheathing, we get a much higher current-rating in the stator-winding, while still using the same permissible temperature of the major insulation as heretofore. In other words, we can tolerate much higher conductor-losses in the stator-windings. If necessary or desirable, it would be possible for us to use a stator conductor-material, such as aluminum, which has a higher resistivity than copper, or, if we still use copper for the stator-conductors, we could use a smaller cross-section of conductor, or, in general, we could use a higher-resistance winding-conductor by using our invention.

The use of a high gauge-pressure for our cooling-gas also increases its corona-breakdown voltage, thus simplifying, or even eliminating, the corona problems which plagued other machines.

Our present invention, in cooperation with the broad principles and detailed designs which are covered in the copending Baudry application, Serial No. 109,999, and its continuation-in-part, Serial No. 248,853, marks the opening of a new era of stator-winding cooling, in turbine-generator design, in marked contrast to the prior art which is of record in said Baudry application, and additional art which is of record in a Moses application, Serial No. 110,010, filed August 12, 1949, patented October 30, 1951, No. 2,573,670. The advantages flowing from our present invention are too numerous and too new for a complete or exhaustive evaluation at the present time.

While we have illustrated our invention, and described its principles, in connection with several illustrative forms of embodiment, we wish it to be understood that our invention, in its broadest aspects, is not limited to the precise details and features which have been chosen for illustrative purposes. We desire, therefore, that our claims may be accorded the broadest construction consistent with their language.

We claim as our invention:

1. A dynamo-electric machine having stator and rotor members, the stator member comprising an annular stator-core having axially extending conductor-receiving slots therein; a stator-winding having one or more straight coil-side portions lying in each of said conductor-receiving slots, and end-winding portions joining the straight coil-side portions at the respective ends of the machine, said stator-winding having a voltage-rating of at least 5,000 volts; each of a plurality of at least said straight coil-side portions including a plurality of relatively lightly insulated conductor-strands, said stranded winding-portions having duct-means for providing one or more cooling-ducts in good thermal contact with the conductor strands, and a major-insulation sheathing-means disposed around said stranded winding-portions; means for providing an electrically insulating fluid and a recirculating path wherein said fluid flows in generally longitudinal directions within said ducts; and heat-exchanging means included in said recirculating path for cooling said fluid; characterized by said recirculating means including fluid-moving means for providing a zone of pressure-differential fluid at each end of the machine; means including approximately radially disposed insulating baffle-ring means, at each end, for providing a zone of intermediate-pressure fluid separated from said pressure-differential fluid at that end, insulating baffle-cap creepage-distance means, at each end, for putting the duct-means of some of the stator-winding coil-side portions into communication with said pressure-differential zone at that end, and for putting the duct-means of the rest of the stator-winding coil-side portions into communication with said intermediate-pressure zone at that end; and heat-exchanger baffling-means for providing a fluid-communication between said intermediate-pressure zone, at each end, at least a portion of the heat-exchanging means, and the other side of said fluid-moving means.

2. A dynamo-electric machine having stator and rotor members, at least one of said members comprising an annular core having axially extending conductor-receiving slots therein; a wound winding having preformed coil-halves, each of a plurality of said coil-halves having a straight coil-side portion lying in a conductor-receiving slot of said core, and an end-winding portion at each end of the core, with a bend between each end-winding portion and its associated coil-side portion; each of said plurality of coil-halves including a plurality of relatively lightly insulated conductor-strands, said stranded winding-portions having duct-means for providing one or more cooling-ducts in good thermal contact with the conductor strands, and a major-insulation sheathing-means disposed around said stranded winding-portions; means for providing an electrically insulating fluid and a recirculating path wherein said fluid flows in generally longitudinal directions within said ducts; and heat-exchanging means included in said recirculating path for cooling said fluid; characterized by said recirculating means including fluid-moving means for providing a zone of pressure-differential fluid at each end of the machine; means including approximately radially disposed insulating baffle-ring means, at each end, for providing one or more zones of intermediate-pressure fluid, separated from one or more zones of pressure-differential fluid at that end; and insulating creepage-distance, communication-means, at each end, between the duct-means of said end-turns and a plurality of said fluid zones, including a pressure-differential zone and an intermediate-pressure zone, for providing substantially separate streams of fluid flowing in generally longitudinal directions in the slot-lying coil-side portions and in the end-winding portions, respectively.

3. A dynamo-electric machine having stator and rotor members, the stator member comprising an annular stator-core having axially extending conductor-receiving slots therein, said stator-core having a plurality of axially spaced, radial ventilating-spaces near the center of the length of the core; a two-layer stator-winding having one or more straight coil-side portions lying in each of said conductor-receiving slots, and end-winding portions joining the straight coil-side portions at the respective ends of the machine, one coil-side of each coil lying in the top half of one slot, and the other coil-side of the same coil lying in the bottom half of a circumferentially displaced slot, said stator-winding having a voltage-rating of at least 5,000 volts; each of a plurality of at least said straight coil-side portions including a plurality of relatively lightly insulated conductor-strands, said stranded winding-portions having duct-means for providing one or more cooling-ducts in good thermal contact with the conductor strands, and a major-insulation sheathing-means disposed around said stranded winding-portions; means for providing an electrically insulating fluid and a recirculating path wherein said fluid flows in generally longitudinal directions within said ducts; and heat-exchanging means included in said recirculating path for cooling said fluid; said recirculating means including fluid-moving means for providing a zone of pressure-differential fluid at each end of the machine; insulating creepage-distance communication-means, at each end, between said pressure-differential zone and the duct-means of all of said stator-winding coil-sides at that end of the machine; and insulation-barrier creepage-distance communication-means, near the center of the length of each of said slot-lying coil-side portions, between the duct-means of that coil-side portion and one or more radial ventilating-spaces in the stator-core, the bottom coil-side of each slot being in communication with one or more radial ventilating-spaces on one side of the centerline of the core, and the top coil-side of the same slot being in communication with one or more radial ventilating-spaces on the other side of the centerline of the core, whereby to provide adequate axial creepage-distances between the communication means of the top and bottom coil-sides in each slot.

4. A dynamo-electric machine having stator and rotor members, and an enclosing housing; the stator member comprising an annular stator-core having axially extending conductor-receiving slots therein; a stator-winding having one or more straight coil-side portions lying in each of said conductor-receiving slots, and end-winding portions joining the straight coil-side portions at the respective ends of the machine, said stator-winding having a voltage-rating of at least 5,000 volts; each of a plurality of at least said straight coil-side portions including a plurality of relatively lightly insulated conductor-strands, said stranded winding-portions having duct-means for providing one or more cooling-ducts in good thermal contact with the conductor strands, and a major-insulation sheathing-means disposed around said stranded winding-portions; said enclosing housing providing a gas-tight chamber within which said stator-core and its winding are located; a gaseous filling, in said chamber, at a pressure over the surrounding atmosphere; means for providing a recirculating path wherein said gaseous filling flows in generally longitudinal directions within said ducts; and heat-exchanging means included in said recirculating path for cooling said gaseous filling; characterized by said recirculating means including gas-moving means for providing a zone of pressure-differential gas at each end of the machine; means including approximately radially disposed insulating baffle-ring means, at each end, for providing a zone of intermediate-pressure gas separated from said pressure-differential gas at that end; insulating baffle-cap creepage-distance means, at each end, for putting the duct-means of some of the stator-winding coil-side portions into communication with said pressure-differential zone at that end, and for putting the duct-means of the rest of the stator-winding coil-side portions into communication with said intermediate-pressure zone at that end; and heat exchanger baffling-means for providing a gas-communication between said intermediate-pressure zone, at each end, at least a portion of the heat-exchanging means, and the other side of said gas-moving means.

5. A dynamo-electric machine having stator and rotor members, and an enclosing housing; at least one of said members comprising an annular core having axially extending conductor-receiving slots therein; a wound winding having preformed coil-halves, each of a plurality of said coil-halves having a straight coil-side portion lying in a conductor-receiving slot of said core, and an end-winding portion at each end of the core, with a bend between each end-winding portion and its associated coil-side portion; each of said plurality of coil-halves including a plurality of relatively lightly insulated conductor-strands, said stranded winding-portions having duct-means for providing one or more cooling-ducts in good thermal contact with the conductor strands, and a major-insulation sheathing-means disposed around said stranded winding-portions; said enclosing housing providing a gas-tight chamber within which said core and its winding are located; a gaseous filling, in said chamber, at a pressure over the surrounding atmosphere; means for providing a recirculating path wherein said gaseous filling flows in generally longitudinal directions within said ducts; and heat-exchanging means included in said recirculating path for cooling said gaseous filling; characterized by said recirculating means including gas-moving means for providing a zone of pressure-differential gas at each end of the machine; means including approximately radially disposed insulating baffle-ring means, at each end, for providing one or more zones of intermediate-pressure gas, separated from one or more zones of pressure-differential gas at that end; and insulating creepage-distance, communication-means, at each end, between the duct-means of said end-turns and a plurality of said gas zones, including a pressure-differential zone and an intermediate-pressure zone, for providing substantially separate streams of gas flowing in generally longitudinal directions in the slot-lying coil-side portions and in the end-winding portions, respectively.

6. A dynamo-electric machine having stator and rotor members, and an enclosing housing; the stator member comprising an annular stator-core having axially extending conductor-receiving slots therein, said stator-core having a plurality of axially spaced, radial ventilating-spaces near the center of the length of the core; a two-layer stator-winding having one or more straight coil-side portions lying in each of said conductor-receiving slots, and end-winding portions joining the straight coil-side portions at the respective ends of the machine, one coil-side of each coil lying in the top half of one slot, and the other coil-side of the same coil lying in the bottom half of a circumferentially displaced slot, said stator-winding having a voltage-rating of at least 5,000 volts; each of a plurality of at least said straight coil-side portions including a plurality of relatively lightly insulated conductor-strands, said stranded winding-portions having duct-means for providing one or more cooling-ducts in good thermal contact with the conductor strands, and a major-insulation sheathing-means disposed around said stranded winding-portions; said enclosing housing providing a gas-tight chamber within which said stator-core and its winding are located; a gaseous filling, in said chamber, at a pressure over the surrounding atmosphere; means for providing a recirculating path wherein said gaseous filling flows in generally longitudinal directions within said ducts; and heat-exchanging means included in said recirculating path for cooling said gaseous filling; said recirculating means including gas-moving means for providing a zone of pressure-differential gas at each end of the machine; insulating creepage-distance communication-means, at each end, between said pressure-differential zone and the duct-means of all of said stator-winding coil-sides at that end of the machine; and insulation-barrier creepage-distance communication-means, near the center of the length of each of said slot-lying coil-side portions, between the duct-means of that coil-side portion and one or more radial ventilating-spaces in the stator-core, the bottom coil-side of each slot being in communication with one or more radial ventilating-spaces on one side of the centerline of the core, and the top coil-side of the same slot being in communication with one or more radial ventilating-spaces on the other side of the centerline of the core, whereby to provide adequate axial creepage-distances between the communication means of the top and bottom coil-sides in each slot.

7. A dynamo-electric machine having a cylindrical-bore stator-member having an alternating-current stator-winding; said stator-winding having a plurality of half-coil portions, each comprising a plurality of stacks of transposed, lightly insulated conductor-strands dividing the current between them, and one or more stacks of discrete substantially rectangular cross-sectioned open-ended ventilating-ducts, each duct having a radial depth corresponding to a plurality of strands, each stack of ducts comprising more than two radially stacked ducts in each stack, and a major-insulation sheathing, with dielectric-barrier properties, surrounding said strands and said ducts.

8. The invention as defined in claim 7, characterized by the major-insulation sheathing being a pressed, consolidated impregnated insulation.

9. A large high-voltage high-speed alternating-current generator having a cylindrical-bore stator-member having a ventilated-conductor high-voltage alternating-current stator-winding, and a cylindrical rotor-member having a ventilated-conductor field-winding, and a gas-filled, hermetically sealed housing enclosing said stator and rotor members; said stator-winding having a plurality of half-coil portions, each comprising a plurality of stacks of transposed, lightly insulated conductor-strands dividing the current between them, and one or more stacks of discrete substantially rectangular cross-sectioned open-ended ventilating-ducts, each duct having a radial depth corresponding to a plurality of strands, each stack of ducts comprising more than two radially stacked ducts in each stack, and a major-insulation sheathing, with dielectric-barrier properties, surrounding said strands and said ducts.

10. The invention as defined in claim 9, characterized by the major-insulation sheathing being a pressed, consolidated impregnated insulation.

11. A dynamo-electric machine having stator and rotor members, the stator member comprising an annular stator-core having axially extending conductor-receiving slots therein; an alternating-current stator-winding having stranded winding-conductors, each stranded winding-conductor comprising a group of relatively lightly insulated conductor-strands dividing the current between them, said stator-winding having coil-side portions lying in said conductor-receiving slots; a means for providing stator-winding duct-means, including one or more stacks of discrete substantially rectangular cross-sectioned open-ended ventilating-ducts, for cooling the respective groups of conductor-strands, each duct having a radial depth corresponding to a plurality of strands, each stack of ducts comprising more than two radially stacked ducts in each stack; a major insulation means disposed immediately around the respective groups of conductor-strands and their respective duct-means, said major insulation means having a voltage-rating of at least 5,000 volts; and a means for causing a cooling-fluid to flow through said stator-winding cooling-ducts.

12. A dynamo-electric machine having stator and rotor members, the stator member comprising an annular stator-core having axially extending conductor-receiving slots therein; an alternating-current stator-winding having a plurality of half-coil portions, each half-coil portion comprising a group of transposed, lightly insulated conductor-strands dividing the current between them, said half-coil portions having coil-side portions lying in said conductor-receiving slots; a means for providing stator-winding duct-means, including one or more stacks of discrete substantially rectangular cross-sectioned open-ended ventilating-ducts, for cooling the respective groups of conductor-strands, each duct having a radial depth corresponding to a plurality of strands, each stack of ducts comprising more than two radially stacked ducts in each stack; a major insulation means disposed immediately around the respective groups of conductor-strands and their respective duct-means, said major insulation means having a voltage-rating of at least 5,000 volts; and a means for providing a recirculating cooling-system comprising an electrically insulating stator-winding cooling-fluid, a fluid-moving means, a heat-exchanging means, and means for providing a recirculating path including said stator-winding duct-means, said stator-winding cooling-fluid, said fluid-moving means, and said heat-exchanging means.

13. A synchronous dynamo-electric machine having a cylindrical-bore stator-member having a ventilated-conductor high-voltage alternating-current stator-winding, and a cylindrical rotor-member having a ventilated-conductor field-winding, and a gas-filled, hermetically sealed housing enclosing said stator and rotor members; a filling of a lighter-than-air gas within said housing at a pressure over the surrounding atmosphere; said stator-winding having a plurality of half-coil portions, each half-coil portion comprising a ventilated stator-winding conductor comprising a group of transposed, lightly insulated conductor-strands dividing the current between them; said ventilated-conductor stator-winding including a means for providing stator-winding cooling-ducts, including one or more stacks of discrete substantially rectangular cross-sectioned open-ended ventilating-ducts, for cooling the respective groups of conductor-strands, each duct having a radial depth corresponding to a plurality of strands, each stack of ducts comprising more than two radially stacked ducts in each stack; a major insulation means disposed immediately around the respective groups of conductor-strands and their respective duct-means, said major insulation means having a voltage-rating of at least 5,000 volts; and a means for providing a recirculating cooling-system comprising a gas-moving means, a heat-exchanging means, and means for providing recirculating paths for causing said gas-moving means to circulate the gas-filling of said housing through the stator and rotor ventilated conductors and through said heat-exchanging means.

14. A dynamo-electric machine having stator and rotor members, the stator member comprising an annular stator-core having axially extending conductor-receiving slots therein; an alternating-current stator-winding having stranded winding-conductors, each stranded winding-conductor comprising two circumferentially displaced stacks of transposed, lightly insulated conductor-strands, lying in a conductor-receiving slot, said strands dividing the current between them, a stack of discrete substantially rectangular cross-sectioned open-ended ventilating-ducts disposed between said stacks of strands, each duct having a radial depth corresponding to a plurality of strands, said stack of ducts comprising more than two radially stacked ducts in said stack, and a major-insulation sheathing, with dielectric-barrier properties, surrounding said strands and said ducts within the slot, said major insulation sheathing having a voltage-rating of at least 5,000 volts; and a means for causing a cooling-fluid to flow through said stator-winding ventilating-ducts.

15. A dynamo-electric machine having stator and rotor members, the stator member comprising an annular stator-core having a plurality of circumferentially spaced axially extending conductor-receiving slots therein; an alternating-current stator-winding having a plurality of half-coil portions; each half-coil portion comprising a stack of lightly insulated conductor strands dividing the current between them, a stack of discrete substantially rectangularly cross-sectioned open-ended ventilating ducts and a major insulation means surrounding said strands and said ducts, each duct having a radial depth corresponding to a plurality of strands, said stack of ducts comprising more than two radially stacked ducts in said stack; said major insulation means having a voltage-rating of at least 5,000 volts; the strands, ducts and major insulation means of each half-coil portion having a coil-side portion lying in a conductor-receiving slot, and a circumferentially extending end-turn portion at each end of the coil-side portion; each end-turn portion of said strands and said ducts terminating in a coil-apex portion; the two halves of each stator-coil having their coil-side portions lying in circumferentially spaced slots and having their coil-apex portions adjacent to each other at an intermediate point between said circumferentially spaced coil-side portions at each end of the coil; and a means for causing a cooling-fluid to flow through said stator-winding ventilating-ducts.

16. The invention as defined in claim 15, characterized by each half-coil portion comprising two circumferentially displaced stacks of strands, with the stack of ducts disposed between said stacks of strands.

References Cited in the file of this patent

UNITED STATES PATENTS

| | | |
|---|---|---|
| 1,001,643 | Howell | Aug. 29, 1911 |
| 1,170,192 | Rudenberg et al. | Feb. 1, 1916 |
| 1,384,864 | Shepherd | July 19, 1921 |
| 1,478,252 | Punga | Dec. 18, 1923 |
| 1,546,234 | Hannah | July 14, 1925 |
| 1,559,182 | Rice | Oct. 27, 1925 |
| 1,677,007 | Summers | July 10, 1928 |
| 2,221,567 | Baudry | Nov. 12, 1940 |
| 2,416,989 | Gauthier | Mar. 4, 1947 |
| 2,484,214 | Ford | Oct. 11, 1949 |

FOREIGN PATENTS

| | | |
|---|---|---|
| 21,822 | Great Britain | of 1912 |
| 96,244 | Switzerland | Sept. 16, 1922 |
| 172,839 | Switzerland | Feb. 1, 1935 |
| 280,879 | Germany | Dec. 1, 1914 |
| 459,729 | Great Britain | June 14, 1937 |
| 714,319 | France | Sept. 1, 1931 |

OTHER REFERENCES

"Cerrobend," a publication by Cerro de Pasco Copper Corp., 40 Wall St., New York, N. Y.